(12) United States Patent
Edwards

(10) Patent No.: US 6,978,051 B2
(45) Date of Patent: Dec. 20, 2005

(54) SYSTEM AND METHOD FOR CAPTURING ADJACENT IMAGES BY UTILIZING A PANORAMA MODE

(75) Inventor: Eric D. Edwards, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 776 days.

(21) Appl. No.: 09/781,587

(22) Filed: Feb. 8, 2001

(65) Prior Publication Data

US 2001/0045986 A1 Nov. 29, 2001

Related U.S. Application Data

(60) Provisional application No. 60/187,331, filed on Mar. 6, 2000.

(51) Int. Cl.[7] ............................................. G06K 9/32
(52) U.S. Cl. ...................... 382/284; 382/294; 348/36
(58) Field of Search ................. 382/284, 287, 382/291, 294, 295, 282, 274, 275; 358/540, 358/450; 348/36, 39, 218.1; 385/538, 540, 385/520; 345/36; 352/69

(56) References Cited

U.S. PATENT DOCUMENTS

| | | | |
|---|---|---|---|
| 5,018,177 A * | 5/1991 | McDavid et al. ............. 378/62 |
| 5,045,872 A | 9/1991 | Yoshimura et al. | |
| 5,138,460 A | 8/1992 | Egawa | |
| 5,262,867 A | 11/1993 | Kojima ........................ 358/209 |
| 5,479,270 A * | 12/1995 | Taylor ......................... 358/488 |
| 5,650,814 A | 7/1997 | Florent et al. ................ 348/39 |
| 5,657,073 A * | 8/1997 | Henley ........................ 348/38 |
| 5,682,197 A | 10/1997 | Moghadam et al. | |
| 5,754,899 A | 5/1998 | Taniguchi et al. .......... 396/243 |
| 5,903,782 A | 5/1999 | Oxaal | |
| 5,940,641 A * | 8/1999 | McIntyre et al. ........... 396/332 |
| 5,973,734 A | 10/1999 | Anderson | |
| 5,982,951 A * | 11/1999 | Katayama et al. .......... 382/284 |
| 6,009,190 A * | 12/1999 | Szeliski et al. ............. 382/154 |
| 6,044,181 A | 3/2000 | Szeliski et al. ............. 382/284 |
| 6,078,701 A * | 6/2000 | Hsu et al. .................... 382/294 |
| 6,128,108 A * | 10/2000 | Teo ............................ 358/540 |
| 6,456,323 B1 * | 9/2002 | Mancuso et al. ......... 348/218.1 |
| 6,466,701 B1 * | 10/2002 | Ejiri et al. .................. 382/284 |
| 6,525,770 B1 * | 2/2003 | Ueda et al. ................. 348/316 |
| 6,552,744 B2 * | 4/2003 | Chen ........................ 348/218.1 |
| 6,563,960 B1 * | 5/2003 | Chan et al. ................. 382/284 |
| 6,714,249 B2 * | 3/2004 | May et al. .................. 348/373 |

* cited by examiner

*Primary Examiner*—Sanjiv Shah
*Assistant Examiner*—Yosef Kassa
(74) *Attorney, Agent, or Firm*—Gregory J. Koerner; Redwood Patent Law

(57) ABSTRACT

A system and method for capturing adjacent images includes an imaging device with a panorama manager that performs various procedures to manipulate one or more image parameters that correspond to adjacent frames of captured image data. An image-stitching software program may then produce a cohesive combined panorama image from the adjacent frames of image data by utilizing the manipulated image parameters.

62 Claims, 9 Drawing Sheets

SYSTEM AND METHOD FOR CAPTURING ADJACENT IMAGES BY UTILIZING A PANORAMA MODE

CROSS-REFERENCE TO RELATED APPLICATIONS

This application relates to, and claims priority in, U.S. Provisional Patent Application Ser. No. 60/187,331, entitled "Automatic Exposure Correction," filed on Mar. 6, 2000. The foregoing related application is commonly assigned, and is hereby incorporated by reference.

BACKGROUND SECTION

1. Field of the Invention

This invention relates generally to techniques for capturing visual information, and relates more particularly to a system and method for capturing adjacent images by utilizing a panorama mode.

2. Description of the Background Art

Implementing effective methods for capturing visual information is a significant consideration for designers and manufacturers of contemporary electronic devices. However, effectively capturing visual information by utilizing electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures, processes, and displays digital image data may benefit from an efficient implementation because of the large amount and complexity of the digital data involved.

In certain applications, a series of adjacent images may be generated by system users of contemporary electronic devices. Such series of adjacent images may then be combined to produce various panoramic or three-dimensional representations of a given scene or object. For example, three-dimensional images of a given target object may be effectively created with a series of adjacent images that are captured while circling the target object.

Due to factors like the growing demands on system functionality, it is apparent that developing new techniques for capturing visual information is a matter of concern for related electronic technologies. Therefore, for all the foregoing reasons, developing effective systems for capturing visual information remains a significant consideration for designers, manufacturers, and users of contemporary electronic devices.

SUMMARY

In accordance with the present invention, a system and method are disclosed for capturing adjacent images by utilizing a panorama mode. In a first embodiment, initially, a system user of a camera device may preferably utilize any appropriate means to select a panorama mode for the camera device. Then, the camera device may preferably capture an initial frame of image data that includes one or more image parameters (such as an exposure parameter, or a white-balance parameter) that are set by an auto-correction module. Next, the panorama manager may preferably store the initial image parameters from the captured initial frame of image data. The panorama manager may then disable the auto-correction module using any effective method. Then, the camera device may preferably capture all remaining adjacent frames of image data by utilizing the previously-stored initial image parameters.

In a second embodiment, initially, a system user may preferably utilize any appropriate means to select a panorama mode for a camera device. Then, a panorama manager may preferably disable the operation of an auto-correction module using any effective method or technique. The camera device may next preferably prompt the system user to perform a sweep procedure across a target area that has been selected for creating a panorama image.

Then, the panorama manager may preferably sample an image parameter range of one or more image parameters from the selected target area. Next, the panorama manager may preferably select one or more global image parameters based upon the previously-obtained sample sets of image parameters from the image parameter range. The panorama manager may select the foregoing global image parameters using any appropriate technique or method. For example, the panorama manager may set the global image parameters equal to a calculated average value or mean value from the sample sets of image parameters in the sampled parameter range. Alternately, the panorama manager may compare the foregoing sample sets of image parameters from the sampled parameter range to a parameter lookup table for determining appropriate global image parameters. In accordance with the present invention, the camera device may then preferably capture all adjacent frames of image data by utilizing the previously-selected global image parameters.

In a third embodiment, initially, a system user may preferably select a panorama mode for operation of a camera device by using any appropriate and effective means or mechanism. Next, the system user preferably may capture initial image data by utilizing the camera device. Then, a panorama manager may preferably store the captured initial image data into frame buffers at a prior frame location.

Next, the camera device may preferably capture and store a new frame of image data into the frame buffers at a current frame location. In accordance with the present invention, the panorama manager may then preferably perform a transition procedure on one or more image parameters of the image data in the prior frame location of the frame buffers.

The panorama manager may then preferably archive the processed frame of image data from the prior frame location of the frame buffers into a memory device. Then, the panorama manage may preferably transfer the image data from the current frame location of the frame buffers into the prior frame location of the frame buffers. The third embodiment may then preferably repeat the foregoing transition procedure on successive pairs of adjacent frames of image data until all frames in the sequence have been captured and processed. The present invention therefore provides an improved a system and method for capturing adjacent images by utilizing a panorama mode.

DETAILED DESCRIPTION

The present invention relates to an improvement in visual information capture techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for capturing adjacent images by utilizing a panorama mode, and preferably includes an imaging device with a panorama manager that may perform various procedures to manipulate one or more image parameters that correspond to adjacent frames of captured image data. An image-stitching software program may then produce a cohesive combined panorama image from the adjacent frames of image data by utilizing the manipulated image parameters.

Figure 1:
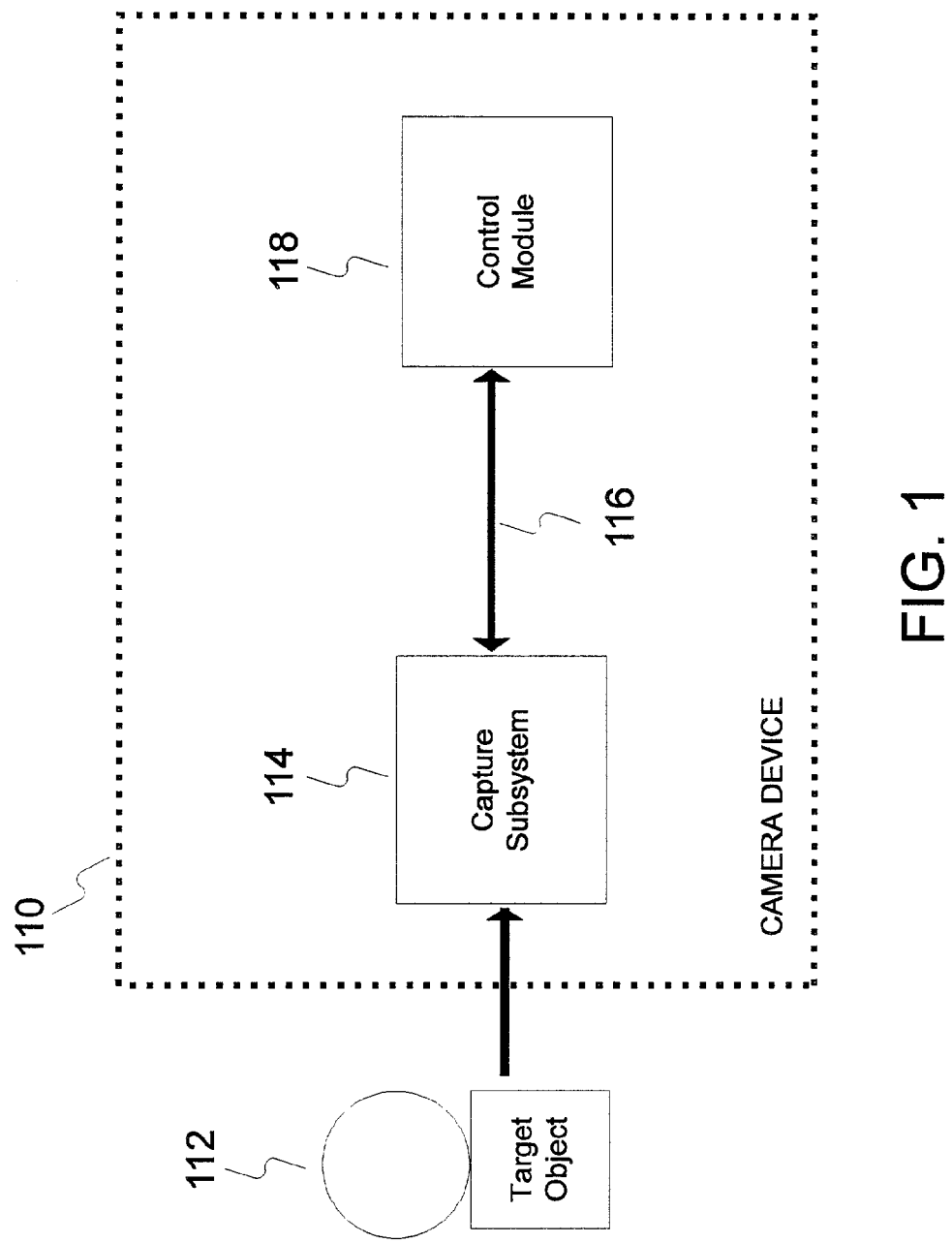
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as part of a scanner device or a digital camcorder.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
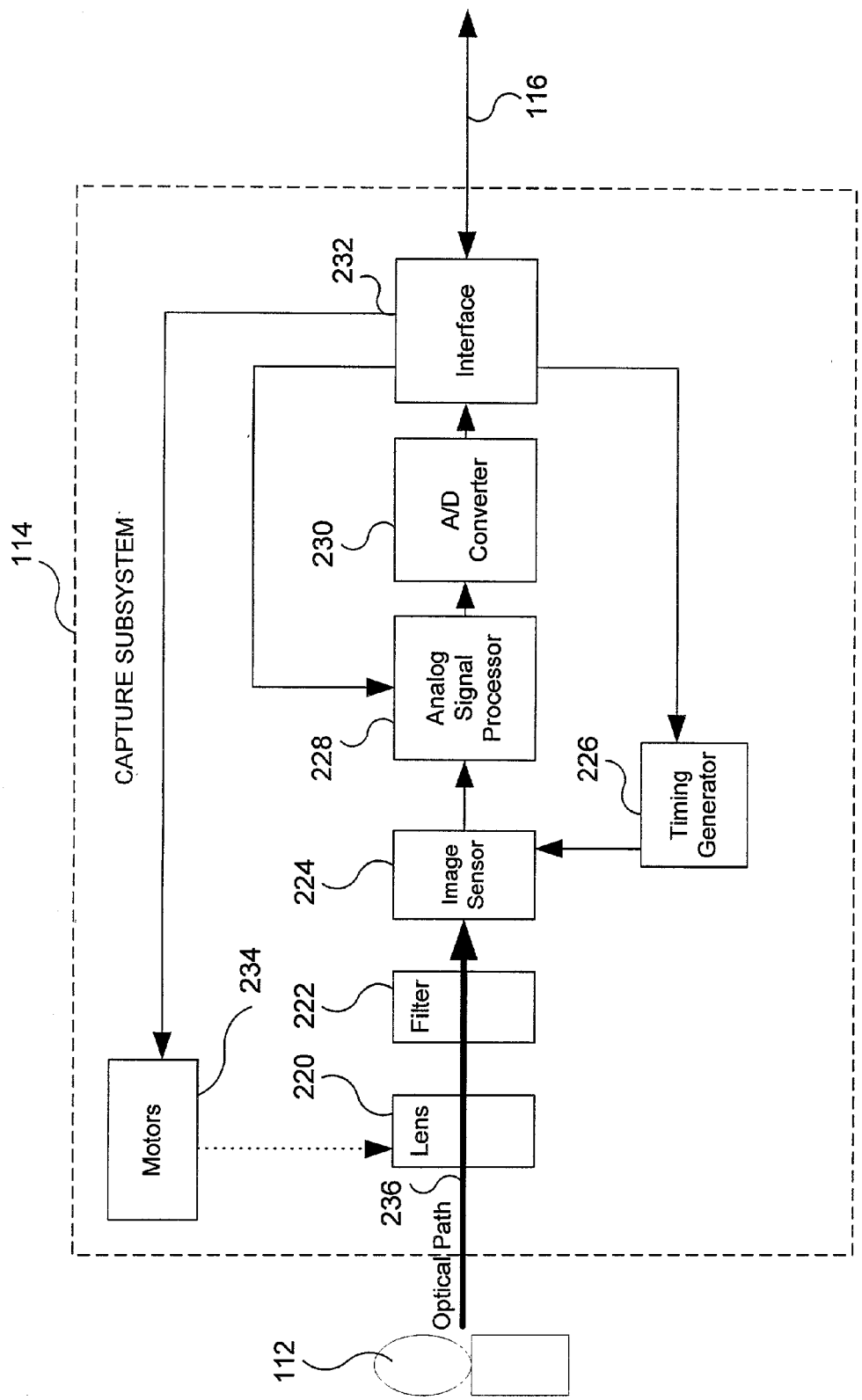
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises a lens 220 having an iris (not shown), a filter 222, an image sensor 224, a timing generator 226, an analog signal processor (ASP) 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through ASP 228, A/D converter 230, and interface 232. Interface 232 may preferably include separate interfaces for controlling ASP 228, motors 234 and timing generator 226. From interface 232, the image data may pass over system bus 116 to control module 118 for appropriate processing and storage.

Figure 3:
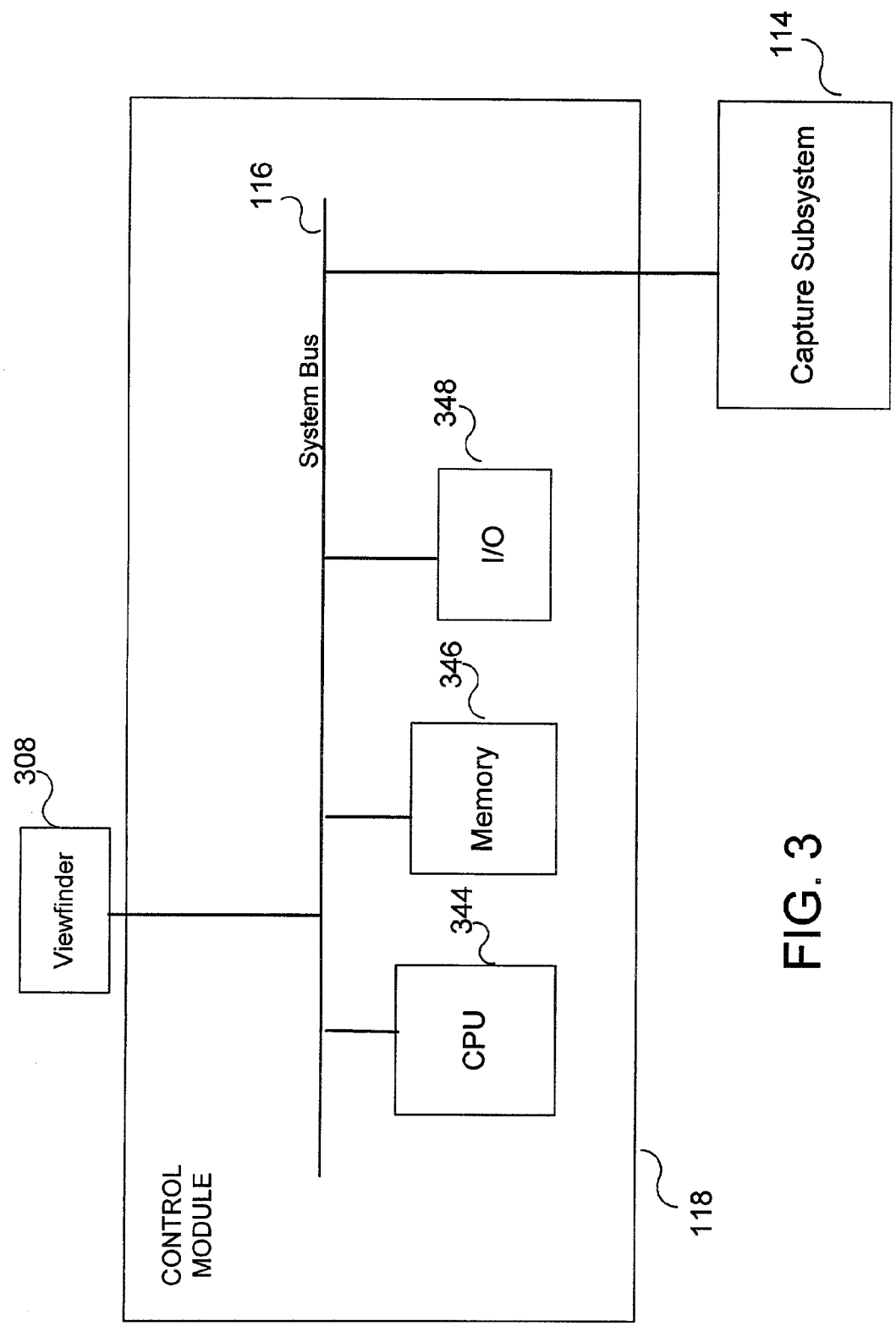
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and an input/output interface (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 9.

Figure 4:
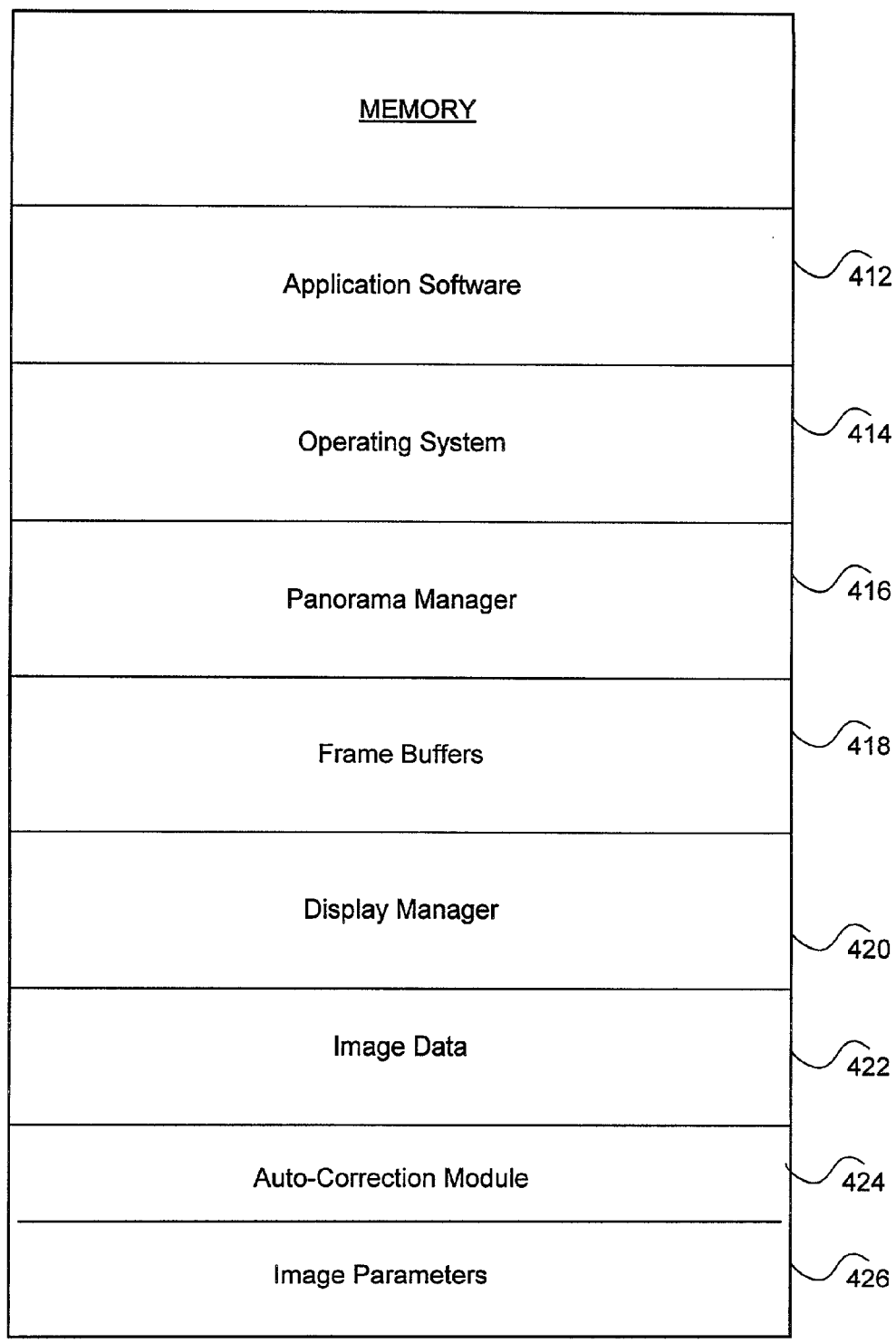
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 preferably includes, but is not limited to, application software 412, an operating system 414, a panorama manager 416, frame buffers 418, a display manager 420, image data 422, an auto-correction module 424, and image parameters 426. In alternate embodiments, memory 346 may readily include various other components in addition to, or instead of, those components discussed in conjunction with the FIG. 4 embodiment.

In the FIG. 4 embodiment, application software 412 may include software instructions that are preferably executed by CPU 344 (FIG. 3) to perform various functions and operations for camera device 110. The particular nature and functionality of application software 412 preferably varies depending upon factors such as the specific type and particular use of the corresponding camera device 110.

In the FIG. 4 embodiment, operating system 414 preferably controls and coordinates low-level functionality of camera device 110. In accordance with the present invention, panorama manager 416 preferably may control and coordinate the operation of a panorama mode to effectively capture a series of adjacent images. Frame buffers 418 may preferably store a prior frame of image data and a current frame of image data as further discussed below in conjunction with FIGS. 8 and 9.

In the FIG. 4 embodiment, display manager 420 preferably may access various image data and responsively display the image data upon viewfinder 308. In certain embodiments of the present invention, panorama manager 416 and display manager 420 may present various types of user interfaces upon viewfinder 308 or elsewhere on camera device 110. For example, a "panorama mode" indicator maybe displayed to signify that camera device 110 is currently operating in a panorama mode. Image data 422 may preferably include individual frames of image data that are each captured using capture subsystem 114 and responsively provided to control module 118, as discussed above in conjunction with FIG. 2.

In the FIG. 4 embodiment, camera device 110 may utilize auto-correction module 424 to automatically generate sets of one or more image parameters 426 that each correspond to an associated frame of image data 422. Auto-correction module 424 may utilize any effective means for generating image parameters 426. In the FIG. 4 embodiment, image parameters may include any desired characteristics, elements, aspects, or features that relate to a corresponding frame of image data 422. For example, image parameters 426 may include one or more of an exposure parameter, a white balance parameter, a brightness parameter, a contrast parameter, a sharpness parameter, a hue parameter, a saturation parameter, and a color balance parameter. Image parameters 426 are further discussed below in conjunction with FIGS. 5 through 9.

Figure 5:
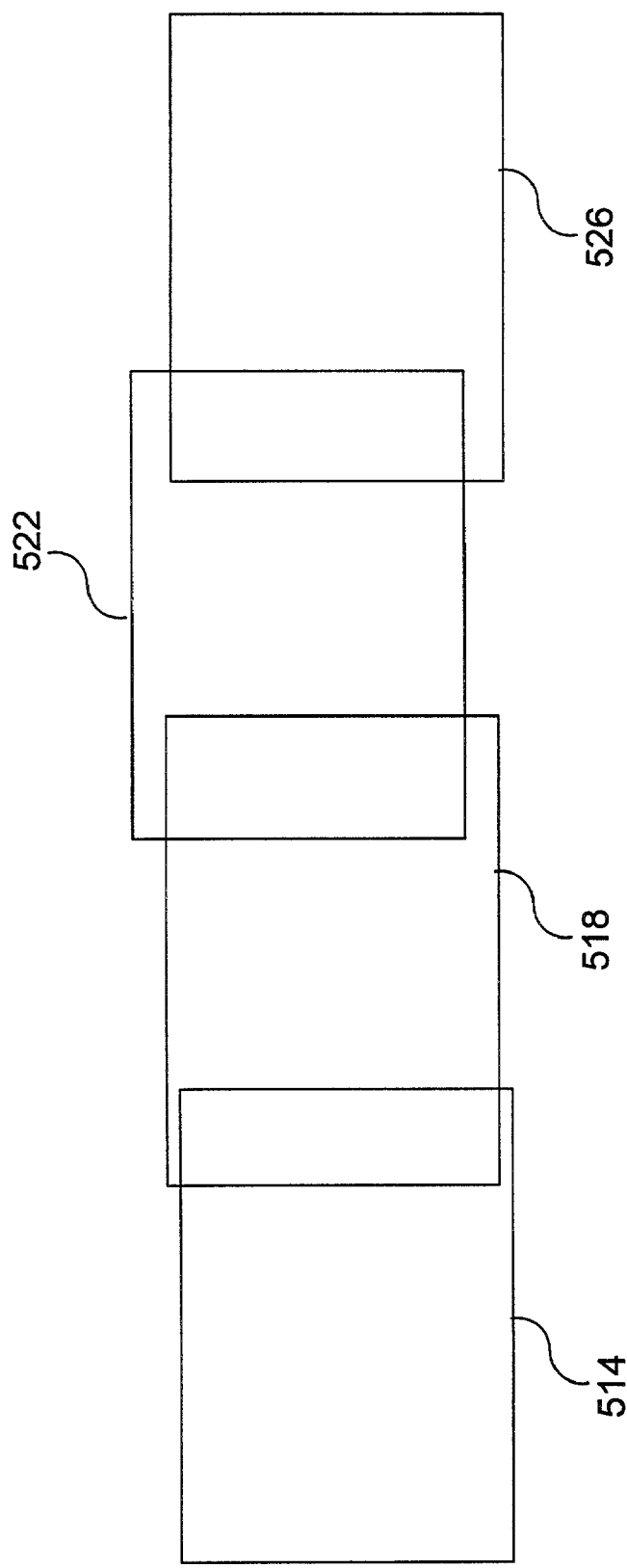
FIG. 5 is a block diagram for one embodiment of a series of adjacent frames of image data.

Referring now to FIG. 5, a block diagram for one embodiment of a series of adjacent frames 510 of image data 422 is shown. In the FIG. 5 embodiment, the series of adjacent images 510 includes, but is not limited to, a frame 514, a frame 518, a frame 522, and a frame 526. The FIG. 5 embodiment is presented for purposes of illustration. In alternate embodiments, selected series of adjacent images may readily include various other frames with various other alignments, in addition to, or instead of, those frames and alignments discussed in conjunction with the FIG. 5 embodiment.

In accordance with the present invention, the adjacent captured frames 514 through 526 may be combined into a continuous extended panorama image by utilizing an image-stitching software program or any other effective means. The foregoing image-stitching software program may be locally present in camera device 110, or may be in a remote location, such as on a host computer device that may download and process image data 422.

A particular photographic target area represented by frames 514 through 526 may include a significantly contrasting range of subject matter and scenic content. For example, lighting conditions across the foregoing photographic target area may range from very dark to extremely bright lighting conditions. Auto-correction module 424 in camera device 110 may therefore generate individual sets of image parameters 426 that vary widely from frame 514 through frame 526.

The foregoing substantial variation in image parameters 426 for adjacent frames 514 through 526 may typically result in significant loss of image cohesiveness when creating a panoramic image. For example, a lack of consistent exposure parameters across frame 514 through frame 526 may produce visible edges between adjacent frames. The present invention therefore provides an improved technique for minimizing sudden variations in image parameters 426 between a series of adjacent frames of image data 422.

In the FIG. 5 embodiment, frames 514 through 526 each preferably include an adjacent frame overlap with the other respective adjacent frames in the horizontal direction. In order for an image stitching software program to effectively create a continuous panorama image by connecting corresponding edges of adjacent frames 514 through 526, an optimized adjacent frame overlap may be utilized. For example, the image stitching software program may require a certain adjacent frame overlap in order to successfully compare and join adjacent frames to thereby produce a single continuous panorama image. However, in order to efficiently capture a maximum amount of new captured image data for each adjacent frame, the optimized adjacent frame overlap may be minimized so that a particular photographic target area may be captured with a smaller number of adjacent frames.

The FIG. 5 embodiment is disclosed with respect to a camera device 110 in which successive adjacent frames of image data 422 are captured in a sequence that moves from left to right across a given photographic target area. However, appropriate changes to the implementation and configuration of camera device 110 may readily be made to facilitate the capture of successive adjacent frames while moving camera device 110 in any desired direction. For example, a system user may utilize a user interface mechanism to choose from a selectable capture sequence that includes one or more of a left-right sequence, a right-left sequence, an up-down sequence, and a down-up sequence.

Figure 6:
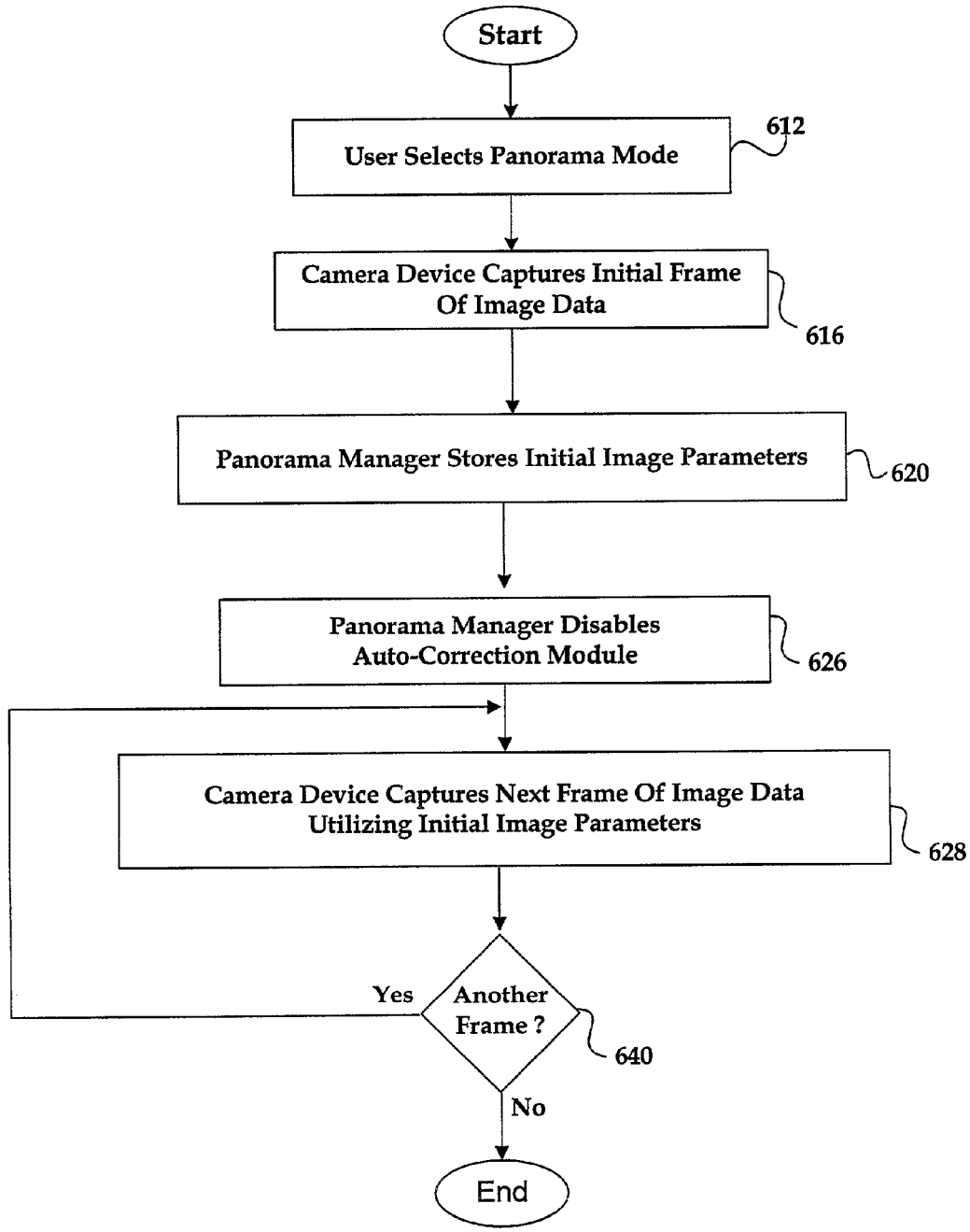
FIG. 6 is a flowchart of method steps for capturing adjacent images by utilizing a panorama mode, in accordance with one embodiment of the present invention.

Referring now to FIG. 6, a flowchart of method steps for utilizing a panorama mode is shown, in accordance with one embodiment of the present invention. The FIG. 6 embodiment is presented for purposes of illustration, and, in alternate embodiments, the present invention may readily utilize various other steps and sequences than those discussed in conjunction with the FIG. 6 embodiment.

In the FIG. 6 embodiment, initially, in step 612, a system user of camera device 110 may preferably utilize any appropriate means to select a panorama mode for camera device 110. Then, in step 616, camera device 110 may preferably capture an initial frame of image data 422 with image parameters 426 set by auto-correction module 424. Next, in step 620, panorama manager 416 may preferably store the initial image parameters 426 from the captured initial frame of image data 422.

In step 626, panorama manager 626 may then disable auto-correction module 424 using any effective method. Then, in step 628, camera device 110 may preferably capture a next frame of image data 422 by utilizing the stored initial image parameters 426 obtained in foregoing step 620. In step 640, camera device 110 determines whether another frame of image data 422 remains to be captured. If no additional frames of image data 422 remain, then the FIG. 6 process terminates. However, if additional frames of image data 422 remain to be captured, then the FIG. 6 process preferably returns to foregoing step 628 to capture all remaining frames by utilizing the stored initial image parameters 426 obtained in foregoing step 620.

Figure 7:
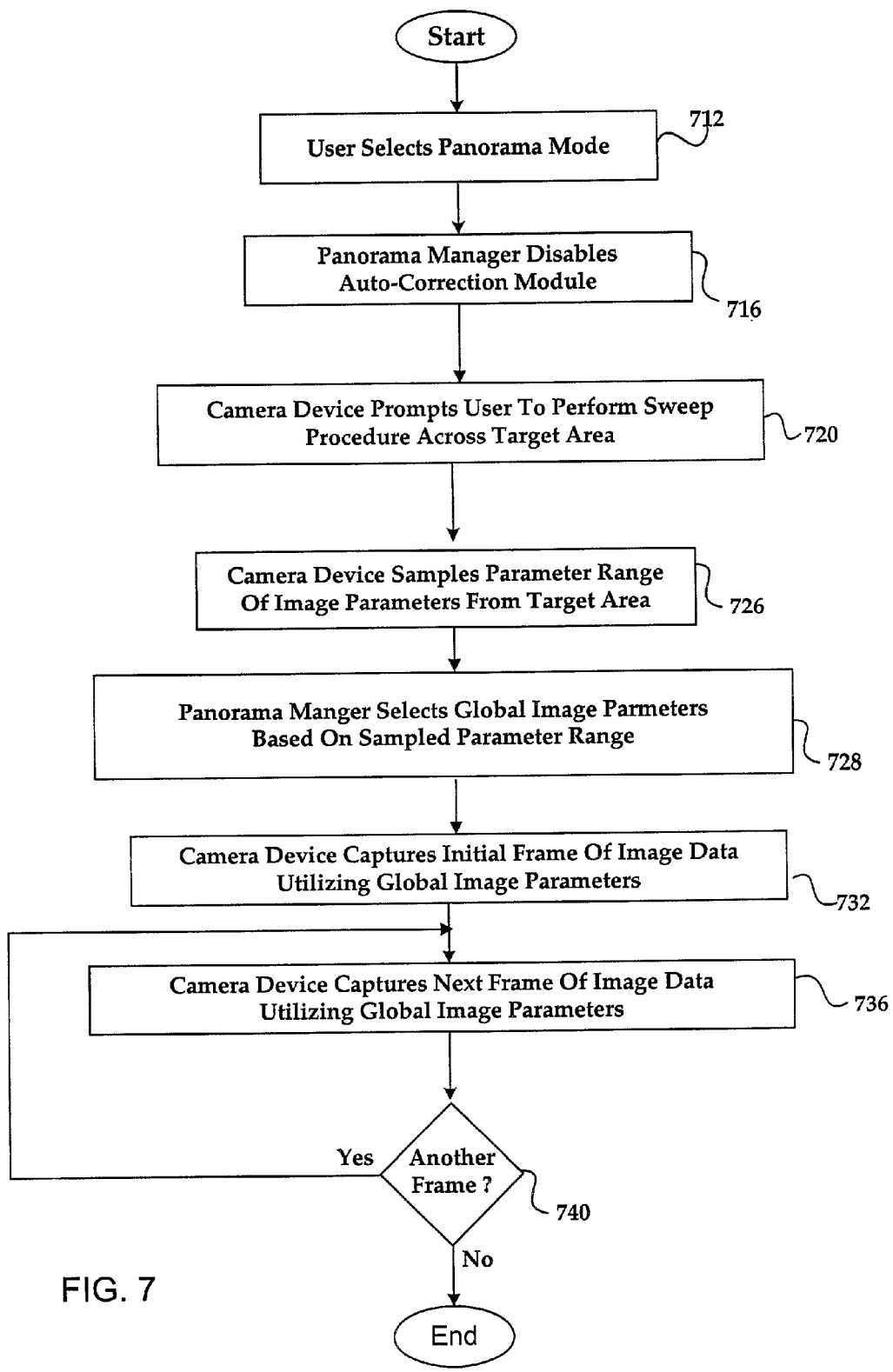
FIG. 7 is a flowchart of method steps for capturing adjacent images by utilizing a panorama mode, in accordance with one embodiment of the present invention.

Referring now to FIG. 7, a flowchart of method steps for utilizing a panorama mode is shown, in accordance with one embodiment of the present invention. The FIG. 7 embodiment is presented for purposes of illustration, and, in alternate embodiments, the present invention may readily utilize various other steps and sequences than those discussed in conjunction with the FIG. 7 embodiment.

In the FIG. 7 embodiment, initially, in step 712, a system user of camera device 110 may preferably utilize any appropriate means to select a panorama mode for camera device 110. Then, in step 716, panorama manager 626 may preferably disable the operation of auto-correction module 424 using any effective method or technique.

In step 720, camera device 110 may preferably prompt the system user to perform a sweep procedure across a target area selected for creating a panorama image. In the FIG. 7 embodiment, panorama manager 416 and display manager 420 may preferably prompt the system user regarding the foregoing sweep procedure by using a user interface on viewfinder 308. Then, in step 726, panorama manager 416 of camera device 110 may preferably sample a parameter range of image parameters 426 from the selected target area. In the FIG. 7 embodiment, panorama manager 416 may capture one or more sample sets of image parameters 426 (for example, five sample sets) from the selected target area. In certain embodiments, the number of sample sets may be proportional to the relative size of the selected target area.

In step 728, panorama manager 416 may preferably select global image parameters based upon the sample sets of image parameters 426 from the image parameter range sampled in foregoing step 726. In the FIG. 7 embodiment, panorama manager 416 may select the foregoing global image parameters using any appropriate technique or method. For example, panorama manager 416 may set the global image parameters equal to calculated average values or mean values from the sample sets of image parameters in the sampled parameter range. Alternately, panorama manager 416 may compare the foregoing sample sets of image parameters from the sampled parameter range to a parameter lookup table for determining appropriate global image parameters.

In step 732, camera device 110 may preferably capture an initial frame of image data 422 by utilizing the global image parameters selected in foregoing step 728. Then, in step 736, camera device 110 may preferably capture a next frame of image data 422 by utilizing the same global image parameters selected in foregoing step 728. In step 740, camera device 110 determines whether another frame of image data 422 remains to be captured. If no additional frames of image data 422 remain, then the FIG. 7 process terminates. However, if additional frames of image data 422 remain to be captured, then the FIG. 7 process preferably returns to foregoing step 736 to capture all remaining frames by utilizing the global image parameters obtained in foregoing step 740.

Figure 8:
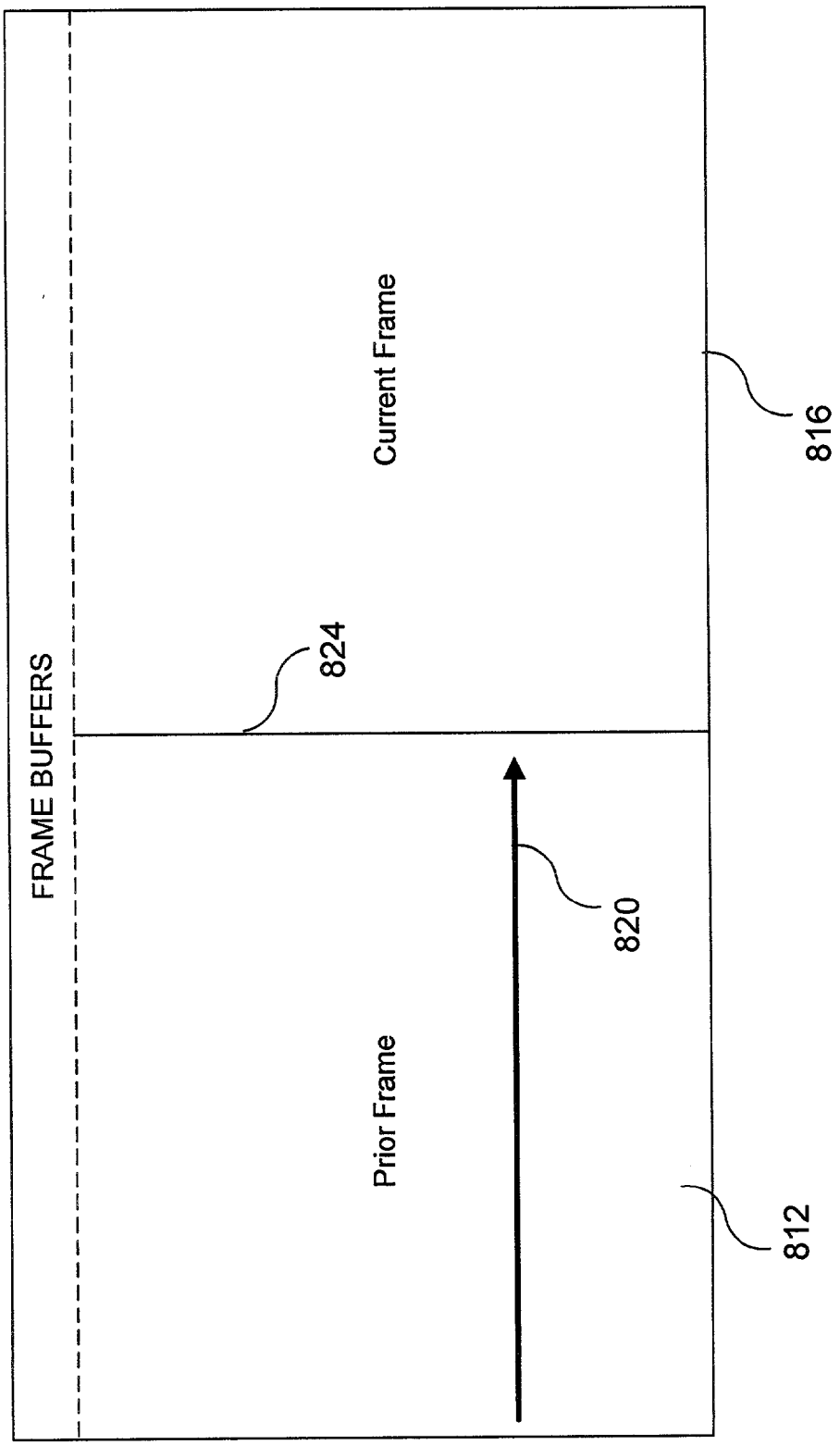
FIG. 8 is a block diagram for one embodiment of the frame buffers of FIG. 4, in accordance with the present invention.

Referring now to FIG. 8, a block diagram for one embodiment of the FIG. 4 frame buffers 418 is shown, in accordance with the present invention. In the FIG. 8 embodiment, frame buffers 418 preferably include, but are not limited to, a prior frame location 812 and a current frame location 816. In alternate embodiments, frame buffers 418 may readily include various other components and functionalities in addition to, or instead of, those components and functionalities discussed in conjunction with the FIG. 8 embodiment.

In the FIG. 8 embodiment, prior frame location 812 may include any appropriate information for representing a particular captured target object 112 or other photographic subject matter. For example, prior frame location 812 may include a series of contiguous digital picture elements (pixels) that collectively represent a selected target object 112. In accordance with the present invention, image data 422 in prior frame location 812 preferably corresponds to a target object 112 (or scene) that was most-recently captured and stored before the image data 422 that is stored in current frame location 816.

In the FIG. 8 embodiment, current frame location 816 may include any appropriate information for representing a particular captured target object 112 or other photographic subject matter. For example, current frame location 816 may include a series of contiguous digital picture elements (pixels) that collectively represent a selected target object 112. In accordance with the present invention, current frame location 816 preferably corresponds to a target object 112 (or scene) that was most-recently captured and stored by camera device 110.

In accordance with the FIG. 8 embodiment of the present invention, panorama manager 416 may perform a transition procedure on the image parameters 426 corresponding to image data 422 stored in prior frame location 812. In practice, panorama manager 416 may preferably obtain initial image parameters 426 associated with image data 422 stored in prior frame location 812. In the FIG. 8 embodiment, panorama manager 416 may assign the foregoing initial image parameters 426 to the far left section of image data 422 in prior frame location 812.

Panorama manager 416 may then gradually alter the initial image parameters 426 in the direction of transition direction arrow 820 in a linear manner to produce transition image parameters 426 that ultimately match the image parameters 426 of image data 422 along adjacent edge 824 at the far left section of current frame location 816. In other words, panorama manager 416 may preferably interpolate the foregoing transition parameters 426 to provide a gradual and approximately linear transition between the initial image parameters 426 assigned to the far left edge of image data 422 in prior frame location 812 and the image parameters 426 provided for image data 422 in current frame location 816 by auto-correction module 424. The functionality and utilization of frame buffers 418 is further discussed below in conjunction with FIG. 9.

Figure 9:
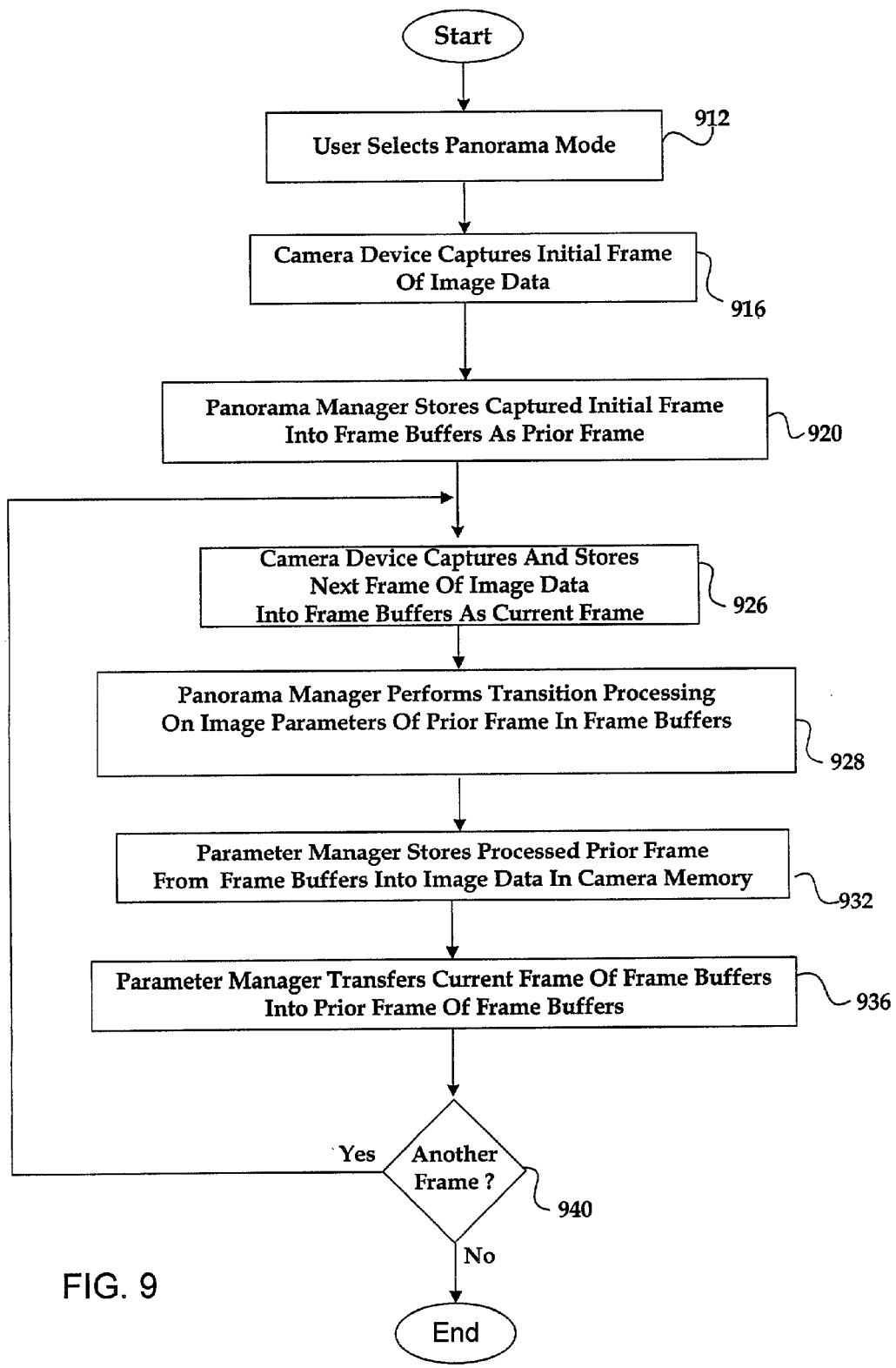
FIG. 9 is a flowchart of method steps for capturing adjacent images by utilizing a panorama mode, in accordance with one embodiment of the present invention.

Referring now to FIG. 9, a flowchart of method steps for utilizing a panorama mode is shown, in accordance with one embodiment of the present invention. The FIG. 9 embodiment is presented for purposes of illustration, and, in alternate embodiments, the present invention may readily utilize various other steps and sequences than those discussed in conjunction with the FIG. 9 embodiment.

In the FIG. 9 embodiment, in step 912, a system user preferably may select a panorama mode for operation of camera device 110 by using any appropriate and effective means or mechanism. In step 916, the system user preferably captures initial image data 422 by utilizing camera device 110. Then, in step 920, a panorama manager 416 preferably stores the captured initial image data 422 into frame buffers 418 at a prior frame location 812.

In step 926, camera device 110 may preferably capture and store a new frame of image data 422 into frame buffers 418 at a current frame location 816. Then, in step 928, panorama manager 416 may preferably perform a transition procedure on image parameters 426 of image data 422 in prior frame location 812 of frame buffers 418. In step 932, panorama manager 416 may preferably store the processed image data 422 in prior frame location 812 (from foregoing step 928) into image data 422 of memory 346. Then, in step 936, panorama manage 416 may preferably transfer image data 422 from the current frame location 816 of frame buffers 418 into the prior frame location 812 of frame buffers 418.

In step 940, the system user preferably may determine whether to capture another frame in the sequence of adjacent frames. If the system user determines not to capture another frame in the sequence of adjacent images, then the FIG. 9 method terminates. However, if the system user determines to capture another frame in the sequence of adjacent frames, then the FIG. 9 method preferably returns to step 926. The FIG. 9 method then preferably may repeatedly perform the foregoing steps 926 through 936 until all frames in the sequence have been captured.

The FIG. 9 embodiment is discussed in the context of a camera device 110 that reiteratively performs the foregoing transition procedure on pairs of adjacent frames of image data 422 as the adjacent frames are captured by a system user. However, in alternate embodiments, the present invention may concurrently perform a transition procedure on a substantial number of adjacent frames. In addition, the foregoing transition procedure may be performed by image processing software in a remote host computer that downloads the adjacent frames of image data 422 from camera device 110.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing a panorama mode in an imaging device, comprising:
    a panorama manager configured to selectively generate one or more image parameters corresponding to adjacent frames of image data that are captured by said imaging device, at least one of said one or more image parameters corresponding to ambient lighting conditions that exist when said image data is captured, said at least one of said one or more image parameters being equal to an average value of a parameter range from all of said adjacent frames of said image data, said one or more image parameters being utilized during said panorama mode to avoid an excessive variation between said adjacent frames of image data; and
    a processor that controls said panorama manager to thereby implement said panorama mode.

2. The system of claim 1 wherein said imaging device is implemented as one of a digital still camera and a digital scanner device.

3. The system of claim 1 wherein an image-stitching software program combines said adjacent frames of image data to form a composite panorama image.

4. The system of claim 3 wherein said panorama manager selects said one or more image parameters to avoid said excessive variation between said adjacent frames of image data to thereby create a cohesive composite image quality for said composite panorama image.

5. The system of claim 1 wherein said one or more image parameters include at least one of an exposure parameter, a white-balance parameter, a brightness parameter, a contrast parameter, a sharpness parameter, a hue parameter, a saturation parameter, and a color balance parameter.

6. The system of claim 1 wherein said imaging device includes a capture subsystem, a viewfinder, and a control module, said control module having a processor, a memory, and an input/output interface.

7. The system of claim 6 wherein said memory includes at least one of an application software program, an operating system, a panorama manager, frame buffers, a display manager, image data, an auto-correction module, and said image parameters.

8. The system of claim 1 wherein a system user selects a panorama mode for operating said imaging device.

9. The system of claim 8 wherein said imaging device captures and stores an initial frame of said adjacent frames of said image data.

10. The system of claim 9 wherein said panorama manager stores an initial image parameter value that corresponds to said initial frame of said image data.

11. The system of claim 10 wherein said panorama manager disables an auto-correction module which automatically selects said one or more image parameters for said imaging device.

12. The system of claim 11 wherein said imaging device captures all of said adjacent frames of said image data by utilizing said initial image parameter value from said initial frame of said image data.

13. The system of claim 8 wherein said panorama manager disables an auto-correction module which automatically selects said one or more image parameters for said imaging device.

14. The system of claim 13 wherein a display manager and said panorama manager display a user interface that prompts said system user to perform a sweep procedure across a panorama target area with said imaging device.

15. The system of claim 14 wherein said imaging device samples and stores said parameter range of current image parameter values from said panorama target area.

16. The system of claim 15 wherein said panorama manager selects a global parameter value from said parameter range of current image parameter values.

17. The system of claim 16 wherein said panorama manager selects said global parameter value by calculating one of said average value of said parameter range and a mean value of said parameter range.

18. The system of claim 16 wherein said panorama manager selects said global parameter value by comparing said parameter range of current parameter values to a pre-determined global parameter lookup table.

19. The system of claim 16 wherein said imaging device captures said adjacent frames of said image data by utilizing said global parameter value.

20. The system of claim 8 wherein said imaging device captures and stores an initial frame of said image data into frame buffers at a prior frame location.

21. The system of claim 20 wherein said imaging device captures and stores a next frame of said image data into said frame buffers at a current frame location.

22. The system of claim 21 wherein said panorama manager performs a transition processing procedure on said image data from said prior frame location of said frame buffers.

23. A system for implementing a panorama mode in an imaging device, comprising:
a panorama manager configured to selectively generate one or more image parameters corresponding to adjacent frames of image data that are captured by said imaging device, said one or more image parameters including an exposure parameter; and
a processor that controls said panorama manager to thereby implement said panorama mode during which a system user selects said panorama mode for operating said imaging device, said imaging device capturing and storing an initial frame of said image data into frame buffers at a prior frame location, said imaging device capturing and storing a next frame of said image data into said frame buffers at a current frame location, said panorama manager performing a transition processing procedure on said image data from said prior frame location of said frame buffers, said transition processing procedure including gradually modifying said one or more image parameters from said image data in said prior frame location of said frame buffers to thereby transition from original values of said one or more image parameters at a first edge of said image data and linearly progressing to matching parameter values at a second edge of said image data, said second edge being adjacent to said image data in said current frame location of said frame buffers, said matching parameter values being equal to said one or more image parameters of said image data in said current frame location.

24. The system of claim 22 wherein said transition processing procedure proceeds in a sequence that is selected from one or more of a left-right sequence, a right-left sequence, an up-down sequence, and a down-up sequence.

25. The system of claim 22 wherein said imaging device archives said image data from said prior frame location of said frame buffers after said transition processing procedure is completed.

26. The system of claim 25 wherein said panorama manager transfers said image data from said current frame location of said frame buffers into said prior frame location of said frame buffers after said imaging device archives said image data that has been processed during said transition processing procedure.

27. The system of claim 26 wherein said imaging device repeatedly captures and processes successive pairs of said adjacent frames of said image data using said transition processing procedure.

28. The system of claim 8 wherein said imaging device captures and stores all of said adjacent frames of said image data, and wherein said panorama manager performs a global transition processing procedure on said all of said adjacent frames in a substantially concurrent event.

29. The system of claim 1 wherein an image processing program on a remote computer device performs a transition processing procedure on said adjacent frames of said image data to create a cohesive combined panorama image.

30. The system of claim 1 wherein said imaging device captures said adjacent frames of said image data in a selectable sequence that includes at least one of a left-right sequence, a right-left sequence, an up-down sequence, and a down-up sequence.

31. A method for implementing a panorama mode in an imaging device, comprising the steps of:
utilizing a panorama manager to selectively generate one or more image parameters corresponding to adjacent frames of image data that are captured by said imaging device, at least one of said one or more image parameters corresponding to ambient lighting conditions that exist when said image data is captured, said at least one of said one or more image parameters being equal to an average value of a parameter range from all of said adjacent frames of said image data, said one or more image parameters being utilized during said panorama mode to avoid an excessive variation between said adjacent frames of image data; and
controls said panorama manager with a processor to thereby implement said panorama mode.

32. The method of claim 31 wherein said imaging device is implemented as one of a digital still camera and a digital scanner device.

33. The method of claim 31 wherein an image-stitching software program combines said adjacent frames of image data to form a composite panorama image.

34. The method of claim 33 wherein said panorama manager selects said one or more image parameters to avoid said excessive variation between said adjacent frames of image data to thereby create a cohesive composite image quality for said composite panorama image.

35. The method of claim 31 wherein said one or more image parameters include at least one of an exposure parameter, a white-balance parameter, a brightness parameter, a contrast parameter, a sharpness parameter, a hue parameter, a saturation parameter, and a color balance parameter.

36. The method of claim 31 wherein said imaging device includes a capture subsystem, a viewfinder, and a control module, said control module having a processor, a memory, and an input/output interface.

37. The method of claim 36 wherein said memory includes at least one of an application software program, an operating system, a panorama manager, frame buffers, a display manager, image data, an auto-correction module, and said image parameters.

38. The method of claim 31 wherein a system user selects a panorama mode for operating said imaging device.

39. The method of claim 38 wherein said imaging device captures and stores an initial frame of said adjacent frames of said image data.

40. The method of claim 39 wherein said panorama manager stores an initial image parameter value that corresponds to said initial frame of said image data.

41. The method of claim 40 wherein said panorama manager disables an auto-correction module which automatically selects said one or more image parameters for said imaging device.

42. The method of claim 41 wherein said imaging device captures all of said adjacent frames of said image data by utilizing said initial image parameter value from said initial frame of said image data.

43. The method of claim 38 wherein said panorama manager disables an auto-correction module which automatically selects said one or more image parameters for said imaging device.

44. The method of claim 43 wherein a display manager and said panorama manager display a user interface that prompts said system user to perform a sweep procedure across a panorama target area with said imaging device.

45. The method of claim 44 wherein said imaging device samples and stores said parameter range of current image parameter values from said panorama target area.

46. The method of claim 45 wherein said panorama manager selects a global parameter value from said parameter range of current image parameter values.

47. The method of claim 46 wherein said panorama manager selects said global parameter value by calculating one of said average value of said parameter range and a mean value of said parameter range.

48. The method of claim 46 wherein said panorama manager selects said global parameter value by comparing said parameter range of current parameter values to a pre-determined global parameter lookup table.

49. The method of claim 46 wherein said imaging device captures said adjacent frames of said image data by utilizing said global parameter value.

50. The method of claim 38 wherein said imaging device captures and stores an initial frame of said image data into frame buffers at a prior frame location.

51. The method of claim 50 wherein said imaging device captures and stores a next frame of said image data into said frame buffers at a current frame location.

52. The method of claim 51 wherein said panorama manager performs a transition processing procedure on said image data from said prior frame location of said frame buffers.

53. A method for implementing a panorama mode in an imaging device, comprising the steps of:
utilizing a panorama manager to selectively generate one or more image parameters corresponding to adjacent frames of image data that are captured by said imaging device, said one or more image parameters including an exposure parameter; and
controls said panorama manager with a processor to thereby implement said panorama mode, during which a system user selects said panorama mode for operating said imaging device, said imaging device capturing and storing an initial frame of said image data into frame buffers at a prior frame location, said imaging device capturing and storing a next frame of said image data into said frame buffers at a current frame location, said panorama manager performing a transition processing procedure on said image data from said prior frame location of said frame buffers, said transition processing procedure including gradually modifying said one or more image parameters from said image data in said prior frame location of said frame buffers to thereby transition from original values of said one or more image parameters at a first edge of said image data and linearly progressing to matching parameter values at a second edge of said image data, said second edge being adjacent to said image data in said current frame location of said frame buffers, said matching parameter values being equal to said one or more image parameters of said image data in said current frame location.

54. The method of claim 52 wherein said transition processing procedure proceeds in a sequence that is selected from one or more of a left-right sequence, a right-left sequence, an up-down sequence, and a down-up sequence.

55. The method of claim 52 wherein said imaging device archives said image data from said prior frame location of said frame buffers after said transition processing procedure is completed.

56. The method of claim 55 wherein said panorama manager transfers said image data from said current frame location of said frame buffers into said prior frame location of said frame buffers after said imaging device archives said image data that has been processed during said transition processing procedure.

57. The method of claim 56 wherein said imaging device repeatedly captures and processes successive pairs of said adjacent frames of said image data using said transition processing procedure.

58. The method of claim 38 wherein said imaging device captures and stores all of said adjacent frames of said image data, and wherein said panorama manager performs a global transition processing procedure on said all of said adjacent frames in a substantially concurrent event.

59. The method of claim 31 wherein an image processing program on a remote computer device performs a transition processing procedure on said adjacent frames of said image data to create a cohesive combined panorama image.

60. The method of claim 31 wherein said imaging device captures said adjacent frames of said image data in a selectable sequence that includes at least one of a left-right sequence, a right-left sequence, an up-down sequence, and a down-up sequence.

61. A system for implementing a panorama mode in an imaging device, comprising:
means for selectively generating one or more image parameters corresponding to adjacent frames of image data that are captured by said imaging device at least one of said one or more image parameters corresponding to ambient lighting conditions that exist when said image data is captured, said at least one of said one or more image parameters being equal to an average value of a parameter range from all of said adjacent frames of said image data, said one or more image parameters being utilized during said panorama mode to avoid an excessive variation between said adjacent frames of image data; and
means for controlling said means for cohesively generating to thereby implement said panorama mode.

62. A computer-readable medium comprising program instructions for implementing a panorama mode by performing the steps of:
utilizing a panorama manager to selectively generate one or more image parameters corresponding to adjacent frames of image data that are captured by said imaging device at least one of said one or more image parameters corresponding to ambient lighting conditions that exist when said image data is captured, said at least one of said one or more image parameters being equal to an average value of a parameter range from all of said adjacent frames of said image data, said one or more image parameters being utilized during said panorama mode to avoid an excessive variation between said adjacent frames of image data; and
controls said panorama manager with a processor to thereby implement said panorama mode.

* * * * *